US012292010B2

(12) United States Patent
Saha et al.

(10) Patent No.: US 12,292,010 B2
(45) Date of Patent: May 6, 2025

(54) DYNAMIC ENGINE SPEED SETTING DURING TRANSIENT EVENT

(71) Applicant: Cummins Inc., Columbus, IN (US)

(72) Inventors: Rohit Saha, Columbus, IN (US); David A. Vittorio, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/510,956

(22) Filed: Nov. 16, 2023

(65) Prior Publication Data

US 2024/0093652 A1 Mar. 21, 2024

Related U.S. Application Data

(63) Continuation of application No. PCT/US2022/072519, filed on May 24, 2022.

(Continued)

(51) Int. Cl.

*F02D 29/04* (2006.01)
*F02B 63/06* (2006.01)
*F02D 41/00* (2006.01)

(52) U.S. Cl.

CPC .............. *F02D 29/04* (2013.01); *F02B 63/06* (2013.01); *F02D 41/0002* (2013.01);

(Continued)

(58) Field of Classification Search

CPC ........ F02D 29/02; F02D 29/04; F02D 31/002; F02D 41/0002; F02D 41/021;

(Continued)

(56) References Cited

U.S. PATENT DOCUMENTS 9,551,284 B2 1/2017 Sohn
10,443,522 B2 10/2019 Park (Continued)

FOREIGN PATENT DOCUMENTS

EP 2851540 3/2015
KR 20130057615 6/2013

(Continued)

OTHER PUBLICATIONS

International Search Report and Written Opinion for International patent application No. PCTUS2022072519, filed May 24, 2022, mailed Sep. 8, 2022, 13 pgs.

*Primary Examiner* — Logan M Kraft
*Assistant Examiner* — Johnny H Hoang
(74) *Attorney, Agent, or Firm* — Taft Stettinius & Hollister LLP

(57) ABSTRACT

A vehicle system and method of controlling a vehicle engine are provided. The method includes determining a speed of an engine in the vehicle system including a hydraulic system and a vehicle propulsion system operatively coupled to the engine. The method includes determining that the engine speed is decreasing and an actual engine speed is less than a target engine speed, and determining a current gear setting and one or more operating parameters of the hydraulic system in response to determining that the engine speed is decreasing and the actual engine speed is less than the target engine speed. The method, in response to the current gear setting being engaged and the one or more operating parameters being greater than a predetermined threshold value, includes controlling the engine speed to be higher than the target engine speed.

27 Claims, 4 Drawing Sheets

Related U.S. Application Data

(60) Provisional application No. 63/193,908, filed on May 27, 2021.

(52) U.S. Cl.
CPC .... *F02D 2200/101* (2013.01); *F02D 2200/50* (2013.01); *F02D 2200/60* (2013.01)

(58) Field of Classification Search
CPC ........... F02D 2200/101; F02D 2200/50; F02D 2200/60; F02B 63/06
See application file for complete search history.

(56) References Cited

U.S. PATENT DOCUMENTS

| | | | | |
|---|---|---|---|---|
| 2006/0113140 | A1 | 6/2006 | Nakamura et al. | |
| 2012/0301332 | A1* | 11/2012 | Clarke | F04B 23/04<br>417/364 |
| 2013/0009403 | A1* | 1/2013 | Cornelius | F03D 9/25<br>290/55 |
| 2019/0232950 | A1* | 8/2019 | Atluri | H04W 4/02 |
| 2021/0025136 | A1 | 1/2021 | Harper | |
| 2022/0016975 | A1* | 1/2022 | Fliearman | B60K 17/36 |
| 2022/0090544 | A1* | 3/2022 | Ambaliya | F02D 31/002 |

FOREIGN PATENT DOCUMENTS

| | | |
|---|---|---|
| KR | 20140080868 | 7/2014 |
| WO | 03066367 | 8/2003 |
| WO | 2020146159 | 7/2020 |

* cited by examiner

DYNAMIC ENGINE SPEED SETTING DURING TRANSIENT EVENT

CROSS-REFERENCE TO RELATED APPLICATIONS

This application is a continuation of International Application No. PCT/US2022/072519 filed May 24, 2022 which claims priority to U.S. Provisional Application No. 63/193,908, filed on May 27, 2021, which are hereby incorporated by reference.

TECHNICAL FIELD

The present disclosure relates generally to controlling a vehicle engine, and more particularly, to dynamically setting vehicle engine speed during transient events.

BACKGROUND

Construction machines such as wheel loaders, for example, have engine speeds that are typically set by an engine throttle. This implies that the engine throttle is generally set to be proportional to a target engine speed. Machine operators will often try to perform some function at zero throttle or commanding function while reducing throttle command. Under these circumstances, the engine will stall if a requested load is greater than steady state torque capability. Due to the demanding transient loads of applications and machinery like wheel loaders, there exists a need to manage the load demand irrespective of engine throttle. As such, there remains a substantial need for the unique methods, systems, and techniques disclosed herein.

Disclosure of Illustrative Embodiments

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

Methods and systems of controlling a vehicle engine are disclosed. An example method includes: determining a speed of an engine in a vehicle system, the vehicle system including a hydraulic system and a vehicle propulsion system operatively coupled to the engine; determining that the engine speed is decreasing and an actual engine speed is less than a target engine speed; determining a current gear setting and one or more operating parameters of the hydraulic system in response to determining that the engine speed is decreasing and the actual engine speed is less than the target engine speed; and in response to the current gear setting being engaged and the one or more operating parameters being greater than a predetermined threshold value, controlling the engine speed to be higher than the target engine speed. An example system includes: an engine configured to propel a vehicle; a sensor configured to sense an engine speed; a hydraulic system operatively coupled to the engine; and an electronic control system operatively coupled to the engine and the hydraulic system, the electronic control system being configured to: receive a signal of the sensor indicative of the engine speed; determine a condition under which the engine speed is decreasing and an actual engine speed is less than a target engine speed; determine a current gear setting and one or more operating parameters of the hydraulic system; and in response determining that the engine speed is decreasing and the actual engine speed is less than the target engine speed and the current gear setting being engaged and the one or more operating parameters being greater than a predetermined threshold value, control the engine speed to be higher than the target engine speed. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF ILLUSTRATIVE EMBODIMENTS

Figure 1:
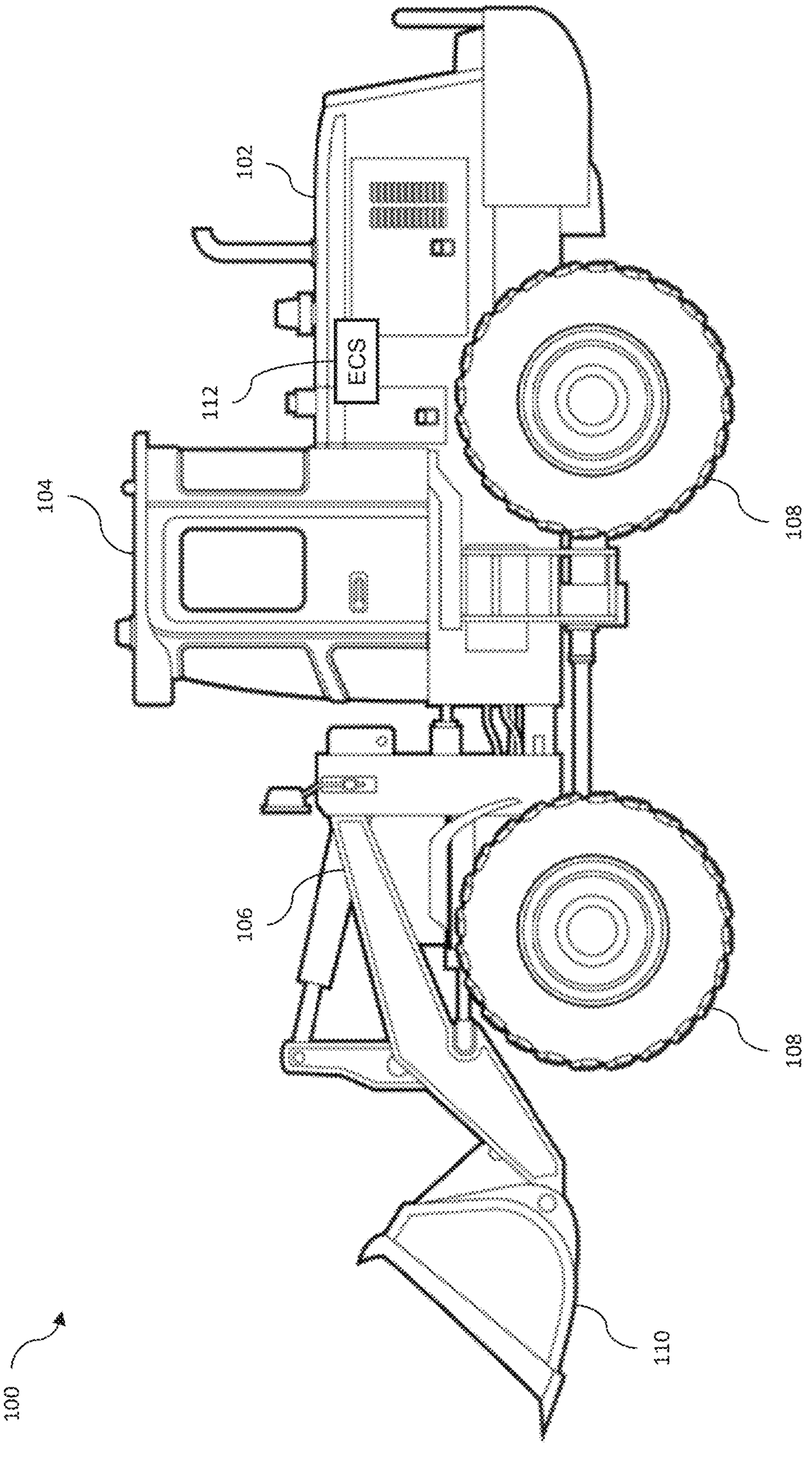
FIG. 1 is a schematic diagram of a vehicle according to an example embodiment.

With reference to FIG. 1, there is illustrated a schematic diagram of a vehicle 100 according to an example embodiment. As shown in FIG. 1, the vehicle 100 may be in the form of a wheel loader including an engine 102, a cab 104, a lift arm 106, wheels 108, and a front end loader 110. Wheel loaders 100 are generally used to load or move material dirt, rocks, demolition debris, construction material, etc. The engine 102 may be an internal combustion engine such as, for example, a diesel or gasoline engine, capable of providing a mechanical or electrical power output that can be converted to hydraulic power. The engine 102 operates at an engine speed and provides an engine torque. The vehicle 100 may be provided with an electronic control system ("ECS") 112 which is configured and operable to receive operator inputs from operator controls provided in the cab 104 and to control the operation of the vehicle 100 in response thereto including in the manners further described below.

The control system 112 may include a controller structured to perform certain operations and to receive and interpret signals from any component and/or sensor of the engine system 100. It shall be appreciated that the controller may be provided in a variety of forms and configurations including one or more computing devices forming a whole or a part of a processing subsystem having non-transitory memory storing computer-executable instructions, processing, and communication hardware. The controller may be a single device or a distributed device, and the functions of the controller may be performed by hardware or software. The controller is in communication with any actuators, sensors, datalinks, computing devices, wireless connections, or other devices to be able to perform any described operations.

The controller may include one or more non-transitory memory devices configured to store instructions in memory which are readable and executable by the controller to control operation of engine 102 as described herein. Certain control operations described herein include operations to determine one or more parameters. The controller may be configured to determine and may perform acts of determining in a number of manners, for example, by calculating or computing a value, obtaining a value from a lookup table or using a lookup operation, receiving values from a datalink or network communication, receiving an electronic signal (e.g., a voltage, frequency, current, or pulse-width modulation (PWM) signal) indicative of the value, receiving output of a sensor, receiving a parameter indicative of the value, reading the value from a memory location on a computer-readable medium, receiving the value as a run-time parameter, and/or by receiving a value by which the interpreted parameter can be calculated, and/or by referencing a default value that is interpreted to be the parameter value.

The controller is one example of a component of the ECS 112 that may be configured to control various operational aspects of vehicle 100 and engine 102 as described in further detail herein. The ECS 112 according to the present disclosure may be implemented in a number of forms and may include a number of different elements and configurations of elements. In certain forms, the ECS 112 may incorporate one or more microprocessor-based or microcontroller-based electronic control units sometimes referred to as electronic control modules. The ECS 112 according to the present disclosure may be provided in forms having a single processing or computing component, or in forms comprising a plurality of operatively coupled processing or computing components; and may comprise digital circuitry, analog circuitry, or a hybrid combination of both of these types. The integrated circuitry of the ECS 112 and/or any of its constituent processors/controllers or other components may include one or more signal conditioners, modulators, demodulators, arithmetic logic units (ALUs), central processing units (CPUs), limiters, oscillators, control clocks, amplifiers, signal conditioners, filters, format converters, communication ports, clamps, delay devices, memory devices, analog to digital (A/D) converters, digital to analog (D/A) converters, and/or different circuitry or functional components as would occur to those skilled in the art to provide and perform the communication and control aspects disclosed herein.

Figure 2:
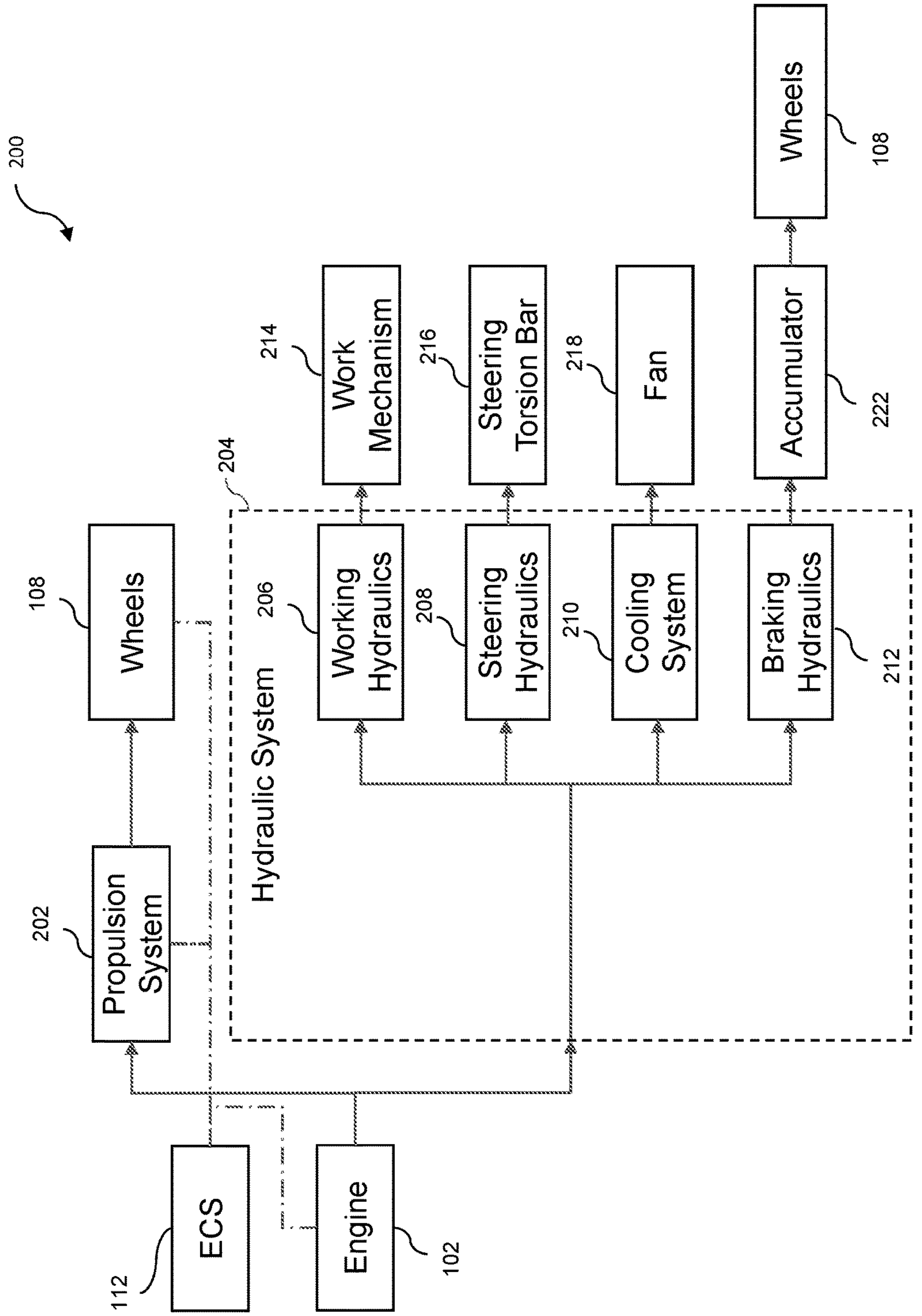
FIG. 2 is a schematic diagram illustrating certain aspects of a vehicle operating system of the vehicle in FIG. 1.

With reference to FIG. 2, there is a schematic diagram illustrating certain aspects of a vehicle system 200 of the vehicle 100 in FIG. 1. As shown in FIG. 2, the engine 102 is configured to output torque to a vehicle propulsion system 202 and a hydraulic system 204 both of which may impose a load on the engine 102 which may vary depending on the operational state of the vehicle 100, its surrounding environment, and inputs from operator controls. The vehicle propulsion system 202 may comprise a transmission and other powertrain or driveline components configured and operable to propel the vehicle 100 by driving the wheels 108. The engine hydraulics system 204 may comprise a number of components and subsystems including working hydraulics 206, steering hydraulics 208, hydraulics cooling 210, and braking hydraulics 212. The engine hydraulics system 204 generally includes one or more hydraulic pumps which are driven by torque from the engine 102 and is configured to supply hydraulic fluid to working hydraulics 206, steering hydraulics 208, hydraulics cooling 210, braking hydraulics 212, and potentially other components and subsystems, where present.

The working hydraulics 206 may be operably coupled to a work mechanism 214 and may include components such as a motor, pump, hydraulic actuators, and other components. The work mechanism 214 may include mechanically powered components such as the lift arm 106 and front end loader 110 that the working hydraulics 206 provide power to implement. In other exemplary embodiments, the work mechanism 214 may include mechanically powered takeoffs, components, or implements (e.g., a drill/auger, a drag, a backhoe, a jaw) where the working hydraulics 206 provides power to implement these components.

The steering hydraulics 208 may be controlled by the hydraulic system 204 to provide hydraulic power to steering torsion bar 216. The cooling system 210 may receive circulating hydraulic fluid from one or more other components and subsystems of hydraulic system 204 to provide power to fan 218 that moves air through the cooling system 210. The hydraulic system 204 may be arranged to hydraulically control the braking hydraulics 212. The braking hydraulics 212 are operably coupled to the wheels 108 to retard movement or decelerate the vehicle 100 when the vehicle 100 is in motion. For example, the braking hydraulics 212 may include front and rear brakes (not shown) operably coupled with the wheels 108 to selectively retard movement or decelerate the vehicle 100. As further described below, the braking hydraulics 212 may comprise an accumulator 222 and be configured to store a supply of pressurized hydraulic fluid used to control one or more brakes 222 operatively coupled to the wheels 108 to slow or stop the vehicle 100.

Figure 3:
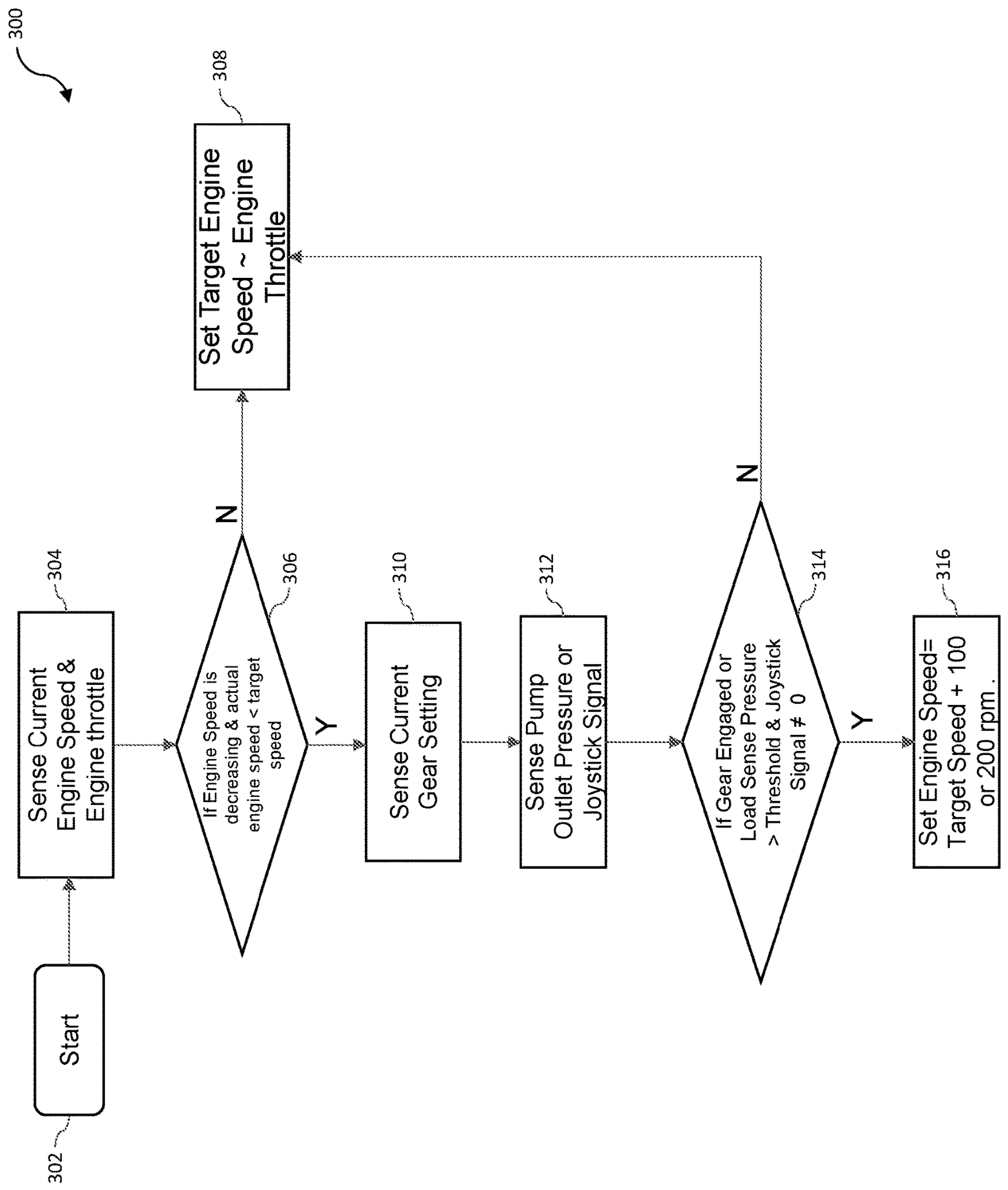
FIG. 3 is a flow diagram illustrating an example procedure 300 for dynamically controlling engine speed.

With reference to FIG. 3, there is illustrated an example procedure 300 for dynamically controlling engine speed. Procedure 300 may be implemented and executed in connection with one or more components of ECS 112 described above in connection with vehicle system 200 or in connection with a number of other ECS components. Procedure 300 begins at start operation 302 and proceeds to operation 304 which senses a current engine speed and engine throttle command or other commanded engine speed value. From operation 304, procedure 300 proceeds to conditional 306. Conditional 306 determines if the engine speed is decreasing based upon the current engine speed and one or more prior values for the current engine speed. Conditional 306 also determines if an actual engine speed is less than a target engine speed based upon the engine throttle command or other command engine speed value.

If the engine speed is not decreasing and an actual engine speed is not less than a target engine speed, procedure 300 proceeds to operation 308 where engine speed during normal engine operation is set to a target engine speed which is proportional to the engine throttle. If the engine speed is decreasing and an actual engine speed is less than a target engine speed, procedure 300 proceeds to operation 310 which senses a current gear setting.

From operation 310, procedure 300 proceeds to operation 312 which senses one or more parameters indicative of an operating state of a hydraulic system driven by the engine. In some example embodiments, the one or more parameters of an operating state of a hydraulic system driven by the engine may include a pump outlet pressure. In some example embodiments, the one or more parameters of an operating state of a hydraulic system driven by the engine may include a signal associated with operator controls (e.g., a joystick) associated with operation of the hydraulic system.

From operation 312, procedure 300 proceeds to conditional 314 which determines whether the gear is engaged, a pump outlet pressure is greater than a threshold, an operator control is in an operative position, or some combination of these operating parameters. If the gear is not engaged, pump outlet pressure is not greater than a threshold, or operator control is not in an operative position, procedure 300 proceeds to operation 308 where engine speed during normal engine operation is set to a target engine speed which is proportional to the engine throttle. If the gear is engaged, and one or more of the pump outlet pressure is greater than a threshold and the operator control is in an operative position, procedure 300 proceeds to operation 316 which sets engine speed to be 100 rpm or 200 rpm higher than a target engine speed.

Figure 4:
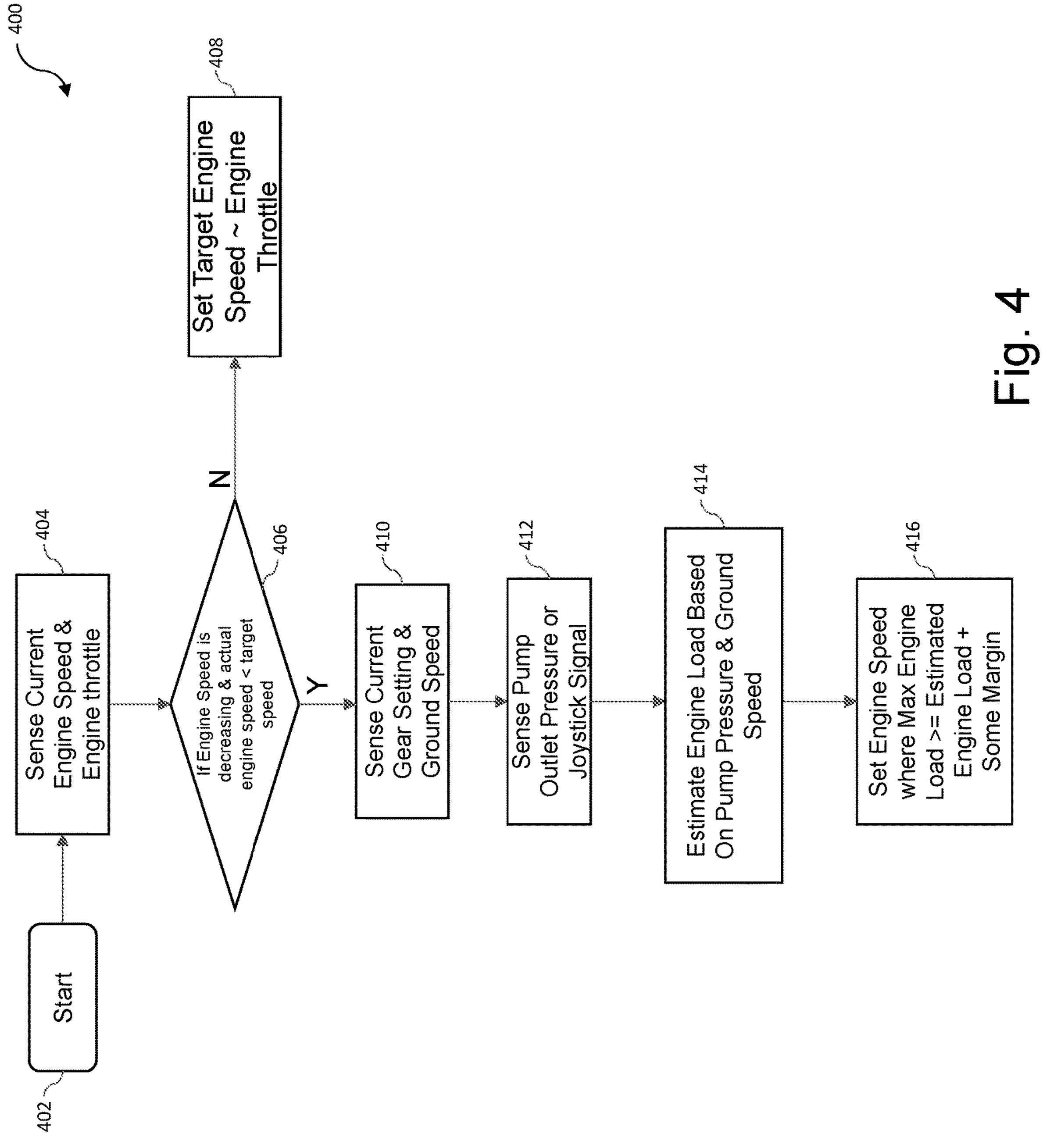
FIG. 4 is a flow diagram illustrating an example operation an example procedure 300 for dynamically controlling engine speed.

With reference to FIG. 4, there is illustrated an example procedure 400 for dynamically controlling engine speed. Procedure 400 may be implemented and executed in connection with one or more components of ECS 112 described above in connection with vehicle system 200 or in connection with a number of other ECS components. Procedure 400 begins at start operation 402 and proceeds to operation 404 which senses a current engine speed and engine throttle command or other commanded engine speed value. From operation 404, procedure 400 proceeds to conditional 406. Conditional 406 determines if the engine speed is decreasing based upon the current engine speed and one or more prior values for the current engine speed. Conditional 406 also determines if an actual engine speed is less than a target engine speed based upon the engine throttle command or other commanded engine speed value.

If the engine speed is not decreasing and an actual engine speed is not less than a target engine speed, procedure 400 proceeds to operation 408 where engine speed during normal engine operation is set to a target engine speed which is proportional to the engine throttle. If the engine speed is decreasing and an actual engine speed is less than a target engine speed, procedure 400 proceeds to operation 410 which senses a current gear setting and engine ground speed.

From operation 410, procedure 400 proceeds to operation 412 which senses one or more parameters indicative of an operating state of a hydraulic system driven by the engine. In some example embodiments, the one or more parameters of an operating state of a hydraulic system driven by the engine may include a pump outlet pressure. In some example embodiments, the one or more parameters of an operating state of a hydraulic system driven by the engine may include a signal associated with operator controls (e.g., a joystick) associated with operation of the hydraulic system.

From operation 412, procedure 300 proceeds to operation 414 which estimates engine load based on pump outlet pressure and engine ground speed. From operation 414, procedure 400 proceeds to operation 416 which sets engine speed where the maximum engine load is greater than or equal to the estimated engine load plus an additional margin (e.g., 2.5% to 10% of an estimated load).

As illustrated by the foregoing description, the present disclosure contemplates multiple embodiments including the following examples.

A first example embodiment is a method comprising: determining a speed of an engine in a vehicle system, the vehicle system including a hydraulic system and a vehicle propulsion system operatively coupled to the engine; determining that the engine speed is decreasing and an actual engine speed is less than a target engine speed; determining a current gear setting and one or more operating parameters of the hydraulic system in response to determining that the engine speed is decreasing and the actual engine speed is less than the target engine speed; and in response to the current gear setting being engaged and the one or more operating parameters being greater than a predetermined threshold value, controlling the engine speed to be higher than the target engine speed.

A second example embodiment includes the features of the first example embodiment, wherein determining one or more operating parameters includes determining a pump outlet pressure.

A third example embodiment includes the features of the first example embodiment, wherein determining one or more operating parameters includes determining a signal corresponding to an operative position of an operator control.

A fourth example embodiment includes the features of the first example embodiment, wherein the engine speed corresponds to the target speed during normal operation.

A firth example embodiment includes the features of the first example embodiment, wherein the target engine speed is regulated by an engine throttle and configured to be proportional to the engine throttle.

A sixth example embodiment includes the features of the fifth example embodiment, wherein the one or more operating parameters correspond to an engine load.

A seventh example embodiment includes the features of the sixth example embodiment, wherein controlling the engine speed to be higher than the target engine speed is in response to a reduction in the engine throttle during an increase in the engine load.

An eighth example embodiment includes the features of the first example embodiment, wherein controlling the engine speed to be higher than the target engine speed includes setting the engine speed to be 100 rpm higher than the target engine speed.

A ninth example embodiment includes the features of the first example embodiment, wherein controlling the engine speed to be higher than the target engine speed includes setting the engine speed to be 200 rpm higher than the target engine speed.

A tenth example embodiment is a vehicle system comprising: an engine configured to propel a vehicle; a sensor configured to sense an engine speed; a hydraulic system operatively coupled to the engine; and an electronic control system operatively coupled to the engine and the hydraulic system, the electronic control system being configured to: receive a signal of the sensor indicative of the engine speed; determine a condition under which the engine speed is decreasing and an actual engine speed is less than a target engine speed; determine a current gear setting and one or more operating parameters of the hydraulic system; and in response determining that the engine speed is decreasing and the actual engine speed is less than the target engine speed and the current gear setting being engaged and the one or more operating parameters being greater than a predetermined threshold value, control the engine speed to be higher than the target engine speed.

An eleventh example embodiment includes the features of the tenth example embodiment, wherein the one or more operating parameters include a pump outlet pressure.

A twelfth example embodiment includes the features of the tenth example embodiment, wherein determining the one or more operating parameters includes an operative position of an operator control.

A thirteenth example embodiment includes the features of the tenth example embodiment, wherein the engine speed corresponds to the target speed during normal operation.

A fourteenth example embodiment includes the features of the tenth example embodiment, wherein the target engine speed is regulated by an engine throttle and configured to be proportional to the engine throttle.

A fifteenth example embodiment includes the features of the fourteenth example embodiment, wherein the one or more operating parameters correspond to an engine load.

A sixteenth example embodiment includes the features of the fifteenth example embodiment, wherein the electronic control system is configured to control the engine speed to be higher than the target engine speed in response to a reduction in the engine throttle during an increase in the engine load.

A seventeenth example embodiment includes the features of the tenth example embodiment, wherein the electronic control system is configured to control the engine speed to be higher than the target engine speed by setting the engine speed to be 100 rpm higher than the target engine speed.

An eighteenth example embodiment includes the features of the tenth example embodiment, wherein the electronic control system is configured to control the engine speed to be higher than the target engine speed by setting the engine speed to be 200 rpm higher than the target engine speed.

A nineteenth example embodiment is a method comprising: determining a speed of an engine in a vehicle system, the vehicle system including a hydraulic system and a vehicle propulsion system operatively coupled to the engine; determining that the engine speed is decreasing and an actual engine speed is less than a target engine speed; determining one or more operating parameters of the hydraulic system in response to determining that the engine speed is decreasing and the actual engine speed is less than the target engine speed; estimating an engine load based on the one or more operating parameters and the actual engine speed; providing a predetermined engine speed associated with the estimated engine load; and controlling the engine speed to be higher than the predetermined engine speed associated with the estimated engine load.

A twentieth example embodiment includes the features of the nineteenth example embodiment, wherein the one or more operating parameters includes determining a pump outlet pressure.

A twenty-first example embodiment includes the features of the nineteenth example embodiment, wherein determining the one or more operating parameters includes determining a signal corresponding to an operative position of an operator control.

A twenty-second example embodiment includes the features of the nineteenth example embodiment, wherein the engine speed corresponds to the target speed during normal operation.

A twenty-third example embodiment includes the features of the nineteenth example embodiment, wherein the target engine speed is regulated by an engine throttle and configured to be proportional to the engine throttle.

A twenty-fourth example embodiment includes the features of the twenty-third example embodiment, wherein the one or more operating parameters correspond to an engine load.

A twenty-fifth example embodiment includes the features of the twenty-fourth example embodiment, wherein controlling the engine speed to be higher than the target engine speed is in response to a reduction in the engine throttle during an increase in the engine load.

A twenty-sixth example embodiment includes the features of the nineteenth example embodiment, wherein controlling the engine speed to be higher than the predetermined engine speed associated with the estimated engine load includes setting the engine speed to a speed corresponding to a maximum load of the engine.

A twenty-seventh example embodiment includes the features of the nineteenth example embodiment, wherein controlling the engine speed to be higher than the predetermined engine speed associated with the estimated engine load includes setting the engine speed to a speed corresponding to a maximum load of the engine plus an additional margin that is 2.5% to 10% of the estimated engine load.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of engine operation, the method comprising:

determining a speed of an engine in a vehicle system, the vehicle system including a hydraulic system and a vehicle propulsion system operatively coupled to the engine;

determining that the engine speed is decreasing based upon an engine speed value and one or more prior engine speed values prior to the engine speed value and an actual engine speed is less than a target engine speed;

determining a current gear setting and one or more operating parameters of the hydraulic system in response to determining that the engine speed is decreasing and the actual engine speed is less than the target engine speed; and in response to the current gear setting being engaged and the one or more operating parameters being greater than a predetermined threshold value, controlling the engine speed to be higher than the target engine speed.

2. The method of claim 1, wherein determining the one or more operating parameters includes determining a pump outlet pressure.

3. The method of claim 1, wherein determining the one or more operating parameters includes determining a signal corresponding to an operative position of an operator control.

4. The method of claim 1, wherein the engine speed corresponds to the target speed during normal operation.

5. The method of claim 1, wherein the target engine speed is regulated by an engine throttle and configured to be proportional to the engine throttle.

6. The method of claim 5, wherein the one or more operating parameters correspond to an engine load.

7. The method of claim 6, wherein controlling the engine speed to be higher than the target engine speed is in response to a reduction in the engine throttle during an increase in the engine load.

8. The method of claim 1, wherein controlling the engine speed to be higher than the target engine speed includes setting the engine speed to be 100 rpm higher than the target engine speed.

9. The method of claim 1, wherein controlling the engine speed to be higher than the target engine speed includes setting the engine speed to be 200 rpm higher than the target engine speed.

10. A vehicle system comprising:

an engine configured to propel a vehicle;

a sensor configured to sense an engine speed;

a hydraulic system operatively coupled to the engine; and an electronic control system operatively coupled to the engine and the hydraulic system, the electronic control system being configured to:

receive a signal of the sensor indicative of the engine speed;

determine a condition under which the engine speed is decreasing in comparison to a prior engine speed and an actual engine speed is less than a target engine speed;

determine a current gear setting and one or more operating parameters of the hydraulic system; and control the engine speed to be higher than the target engine speed in response to determining that the engine speed is decreasing and the actual engine speed is less than the target engine speed and the current gear setting being engaged and the one or more operating parameters being greater than a predetermined threshold value.

11. The system of claim 10, wherein the one or more operating parameters include a pump outlet pressure.

12. The system of claim 10, wherein the one or more operating parameters includes an operative position of an operator control.

13. The system of claim 10, wherein the engine speed corresponds to the target speed during normal operation.

14. The system of claim 10, wherein the target engine speed is regulated by an engine throttle and configured to be proportional to the engine throttle.

15. The system of claim 14, wherein the one or more operating parameters correspond to an engine load.

16. The system of claim 15, wherein the electronic control system is configured to control the engine speed to be higher than the target engine speed in response to a reduction in the engine throttle during an increase in the engine load.

17. The system of claim 10, wherein the electronic control system is configured to control the engine speed to be higher than the target engine speed by setting the engine speed to be 100 rpm higher than the target engine speed.

18. The system of claim 10, wherein the electronic control system is configured to control the engine speed to be higher than the target engine speed by setting the engine speed to be 200 rpm higher than the target engine speed.

19. A method of vehicle operation, the method comprising:

determining a speed of an engine in a vehicle system, the vehicle system including a hydraulic system and a vehicle propulsion system operatively coupled to the engine;

determining that the engine speed is decreasing in response to multiple engine speed values separated in time and an actual engine speed is less than a target engine speed;

determining one or more operating parameters of the hydraulic system in response to determining that the engine speed is decreasing and the actual engine speed is less than the target engine speed;

estimating an engine load based on the one or more operating parameters and the actual engine speed;

providing a predetermined engine speed associated with the estimated engine load; and controlling the engine speed to be higher than the predetermined engine speed associated with the estimated engine load.

20. The method of claim 19, wherein determining the one or more operating parameters includes determining a pump outlet pressure.

21. The method of claim 19, wherein determining the one or more operating parameters includes determining a signal corresponding to an operative position of an operator control.

22. The method of claim 19, wherein the engine speed corresponds to the target speed during normal operation.

23. The method of claim 19, wherein the target engine speed is regulated by an engine throttle and configured to be proportional to the engine throttle.

24. The method of claim 23, wherein the one or more operating parameters correspond to an engine load.

25. The method of claim 24, wherein controlling the engine speed to be higher than the target engine speed is in response to a reduction in the engine throttle during an increase in the engine load.

26. The method of claim 19, wherein controlling the engine speed to be higher than the predetermined engine speed associated with the estimated engine load includes setting the engine speed to a speed corresponding to a maximum load of the engine.

27. The method of claim 19, wherein controlling the engine speed to be higher than the predetermined engine speed associated with the estimated engine load includes setting the engine speed to a speed corresponding to a maximum load of the engine plus an additional margin that is 2.5% to 10% of the estimated engine load.

* * * * *